(12) United States Patent  (10) Patent No.: US 8,512,429 B2
Barratt  (45) Date of Patent: Aug. 20, 2013

(54) COALESCING FILTER ELEMENT WITH DRAINAGE MECHANISM

(75) Inventor: Thomas R. Barratt, Myersville, MD (US)

(73) Assignee: Johnson Controls Technology Company, Holland, MI (US)

( * ) Notice: Subject to any disclaimer, the term of this patent is extended or adjusted under 35 U.S.C. 154(b) by 517 days.

(21) Appl. No.: 12/708,669

(22) Filed: Feb. 19, 2010

(65) Prior Publication Data

US 2010/0146915 A1  Jun. 17, 2010

Related U.S. Application Data

(63) Continuation of application No. 11/460,754, filed on Jul. 28, 2006, now Pat. No. 7,686,859.

(60) Provisional application No. 60/705,574, filed on Aug. 4, 2005.

(51) Int. Cl.
*B01D 46/00* (2006.01)

(52) U.S. Cl.
USPC .................. 55/423; 55/428; 55/486; 55/498; 55/DIG. 25

(58) Field of Classification Search
USPC ............. 55/423, 428, 486–489, 498, DIG. 25
See application file for complete search history.

(56) References Cited

U.S. PATENT DOCUMENTS

| | | |
|---|---|---|
| 1,915,987 A | 6/1933 | Fisher et al. |
| 2,404,468 A | 7/1946 | Vokes et al. |
| 2,511,967 A | 6/1950 | Campbell |
| 2,547,769 A | 4/1951 | Packie et al. |
| 2,610,697 A | 9/1952 | Lovelady et al. |
| 2,618,132 A | 11/1952 | Pottenger, Jr. |
| 3,199,676 A | 8/1965 | May |
| 3,283,532 A | 11/1966 | Kocher |
| 3,552,553 A | 1/1971 | Reading |
| 3,708,965 A | 1/1973 | Domnick |
| 3,917,474 A | 11/1975 | Heckenkamp et al. |
| 3,923,480 A | 12/1975 | Visch |
| 4,050,237 A | 9/1977 | Pall et al. |
| 4,155,726 A | 5/1979 | Steinmeyer |
| 4,231,768 A | 11/1980 | Seibert et al. |
| 4,516,994 A | 5/1985 | Kocher |
| 4,564,377 A | 1/1986 | Kocatas |
| 4,838,905 A | 6/1989 | Billiet et al. |
| H773 H | 5/1990 | Keedwell et al. |
| 5,129,923 A | 7/1992 | Hunter et al. |
| 5,170,640 A | 12/1992 | Heitmann et al. |
| 5,536,153 A | 7/1996 | Edwards |
| 5,718,744 A | 2/1998 | Ehlert |
| 5,824,232 A | 10/1998 | Asher et al. |
| 5,863,317 A | 1/1999 | Smith et al. |

(Continued)

FOREIGN PATENT DOCUMENTS

CN  2502315 Y  10/2001
DE  19508815 A1  9/1996

(Continued)

*Primary Examiner* — Christopher P Jones (74) *Attorney, Agent, or Firm* — McNees Wallace & Nurick LLC (57) ABSTRACT

The lubricant coalescing filter element is provided that includes a cylindrical outer screen member, at least one filter element disposed inside the cylindrical outer screen member and being coaxial with the outer screen member, and a drainage arrangement disposed between the cylindrical outer screen member and the at least one filter element to drain accumulated lubricant out of the at least one filter element.

23 Claims, 12 Drawing Sheets

(56) References Cited

U.S. PATENT DOCUMENTS

| | | |
|---|---|---|
| 6,007,608 A | 12/1999 | Johnson |
| 6,387,142 B1 | 5/2002 | Pieciak et al. |
| 6,419,721 B1 | 7/2002 | Hunter |
| 6,517,615 B2 | 2/2003 | Miller et al. |
| 6,616,719 B1 | 9/2003 | Sun et al. |
| 2004/0065110 A1 | 4/2004 | Barratt et al. |
| 2004/0089153 A1 | 5/2004 | Burns et al. |
| 2005/0022551 A1 | 2/2005 | Barratt et al. |
| 2005/0092179 A1 | 5/2005 | Barnwell |

FOREIGN PATENT DOCUMENTS

| | | |
|---|---|---|
| GB | 2 261 830 A | 6/1993 |
| WO | 89/07484 A | 8/1989 |
| WO | 98/33578 A | 8/1998 |
| WO | 98/52676 A1 | 11/1998 |
| WO | 00/43100 A1 | 7/2000 |
| WO | 2004009210 A1 | 1/2004 |

COALESCING FILTER ELEMENT WITH DRAINAGE MECHANISM

CROSS REFERENCE TO RELATED APPLICATIONS

This application is a continuation of U.S. application Ser. No. 11/460,754, filed Jul. 28, 2006, now U.S. Pat. No. 7,686,859, which claims the benefit of U.S. Provisional Application No. 60/705,574 filed on Aug. 4, 2005, which Applications are hereby incorporated by reference.

BACKGROUND OF THE INVENTION

The present invention relates generally to a coalescing filter element for a compression system. In particular, the present invention relates to an oil coalescing filter element having a drainage mechanism to reduce the amount of oil entrained in the filter media.

Positive displacement compressors are machines in which successive volumes of air or gas are confined within a closed space and elevated to a higher pressure. The pressure of the gas is increased while the volume of the closed space is decreased. Positive displacement compressors include, for example, reciprocating compressors, rotary compressors, scroll compressors and screw compressors. These compressors rely on lubricating oil to lubricate rotating and contacting surfaces to allow for efficient operation, to prevent damage to the units and to seal the volume being compressed.

For example, a screw compressor generally includes two cylindrical rotors mounted on separate shafts inside a hollow, double-barreled casing. The side walls of the compressor casing typically form two parallel, overlapping cylinders which house the rotors side-by-side, with their shafts parallel to the ground. Screw compressor rotors typically have helically extending lobes and grooves on their outer surfaces forming a large thread on the circumference of the rotor. During operation, the threads of the rotors mesh together, with the lobes on one rotor meshing with the corresponding grooves on the other rotor to form a series of gaps between the rotors. These gaps form a continuous compression chamber that communicates with the compressor inlet opening, or port, at one end of the casing and continuously reduces in volume as the rotors turn and compress the gas toward a discharge port at the opposite end of the casing. Lubricant is introduced into the compressor at a relatively constant rate from a lubricant circulation system to lubricate the rotor shafts, bearings and seals, to help seal the clearances between the screws during operation of the compressor, and to help remove the heat of compression, thereby preventing the compressor from overheating and to help reduce the noise associated with compressor operation.

Lubricants typically are some type of oil-based liquid compound, this part of the compressor system often being referred to simply as the "lube-oil" system. Compressor lube-oil systems generally include a collection reservoir, filter, and pressure and/or temperature sensors. The lube-oil may be circulated as a result of the pressure differential in the system across the evaporator and condenser, such as in water chiller screw drive compressor systems, or the lube-oil may be circulated by a motor driven pump such as in larger reciprocating compressors. Since many lubricants degrade at high temperature by losing viscosity, compressors operating at high temperatures, such as with screw compressors, generally include specially formulated lube-oil systems and also include a cooler for reducing the temperature of the lubricant before it is recirculated to the seals and bearings. So-called "oil flooded" screw compressors may further include means for recirculating lubricant through the inside of the compressor casing. Such "lube-oil injection" directly into the gas stream has been found to help cool and lubricate the rotors, block gas leakage paths between or around the rotors, inhibit corrosion, and minimize the level of noise produced by screw compressors.

As is evident in these positive displacement type compressors, lubricant and fluid in the gaseous state are mixed as a result of compressor operation. Under these high pressures and temperatures, the lubricant forms droplets of various sizes. These droplets typically are entrained in the gas stream and must be removed before the compressed gas is transported away from the compressor. To prevent the lubricant entrained in the gas stream from moving downstream, a separator section can be used. The compressed gas may be forced to follow a tortuous path or contact a surface where larger droplets can agglomerate and can be cycled back into a sump-type device for reuse, lubricating the moving parts of the compressor. To capture the finer aerosol droplets that are not agglomerated into droplets of sufficient size to be separated, the separator section typically employs a coalescer or filter unit through which the compressed gas and aerosol must pass before being discharged downstream of the separator. However, one problem with the use of the coalescer or filter unit is that the captured lubricant remains and accumulates in the coalescer or filter unit thereby reducing the amount of area of the coalescer or filter unit that can be used to capture lubricant.

Therefore, what is needed is a mechanism for a coalescer or filter element that can facilitate the drainage of the captured lubricant from the coalescer or filter element.

SUMMARY OF THE INVENTION

One embodiment of the present invention is directed to a lubricant coalescing filter element for use in a refrigeration system. The lubricant coalescing filter element includes a cylindrical outer screen member, at least one filter element disposed inside the cylindrical outer screen member and being coaxial with the outer screen member, and a drainage arrangement disposed between the cylindrical outer screen member and the at least one filter element to drain accumulated lubricant out of the at least one filter element.

Another embodiment of the present invention is directed to a lubricant coalescing filter element for use in a gas compression system. The lubricant coalescing filter element includes a cylindrical outer screen member, at least one filter element disposed inside the cylindrical outer screen member and being coaxial with the outer screen member, and a drainage arrangement disposed between the cylindrical outer screen member and the at least one filter element to drain accumulated lubricant out of the at least one filter element.

Still another embodiment of the present invention is directed to a lubricant coalescing element for use in a gas compression system. The lubricant coalescing element includes a cylindrical outer screen member, at least one filter element disposed inside the cylindrical outer screen member and coaxial with the cylindrical outer screen member, and a drainage arrangement in contact with the at least one filter element to drain accumulated lubricant out of the at least one filter element.

A further embodiment of the present invention is directed to a lubricant coalescing element for use in a refrigeration system. The lubricant coalescing element includes a cylindrical outer screen member, at least one filter element disposed inside the cylindrical outer screen member and coaxial with the cylindrical outer screen member, and at least one drainage member in contact with the at least one filter element and disposed between the cylindrical outer screen member and the at least one filter element to drain accumulated lubricant out of the at least one filter element.

Another embodiment of the present invention is directed to a separator arrangement to remove entrained lubricant from a compressed gas. The separator arrangement includes a shell having an inlet port and a discharge port, a first stage disposed in the shell, a second stage disposed in the shell adjacent to the first stage, and a third stage disposed in the shell adjacent to the second stage. The first stage is configured to change a direction flow of gas entering the shell through the inlet port. The second stage is configured to remove lubricant droplets from the gas flow. The third stage is configured to remove entrained lubricant mist and aerosol from the gas flow. The third stage includes a coalescing element having a cylindrical outer screen member disposed horizontally in the third stage, at least one filter element disposed inside the cylindrical outer screen member and coaxial with the outer screen member, and a drainage arrangement in contact with the at least one filter element to drain accumulated lubricant out of the at least one filter element.

One advantage of the present invention is that an increased amount of media area of the coalescing element is available to capture lubricant.

Another advantage of the present invention is that it can easily and cost-effectively be manufactured.

Still another advantage of the present invention is that the pressure drop of the compressed gas through the coalescing element is reduced.

A further advantage of the present invention is an increase in the limit on the velocity of compressed gas flowing through the coalescing element.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
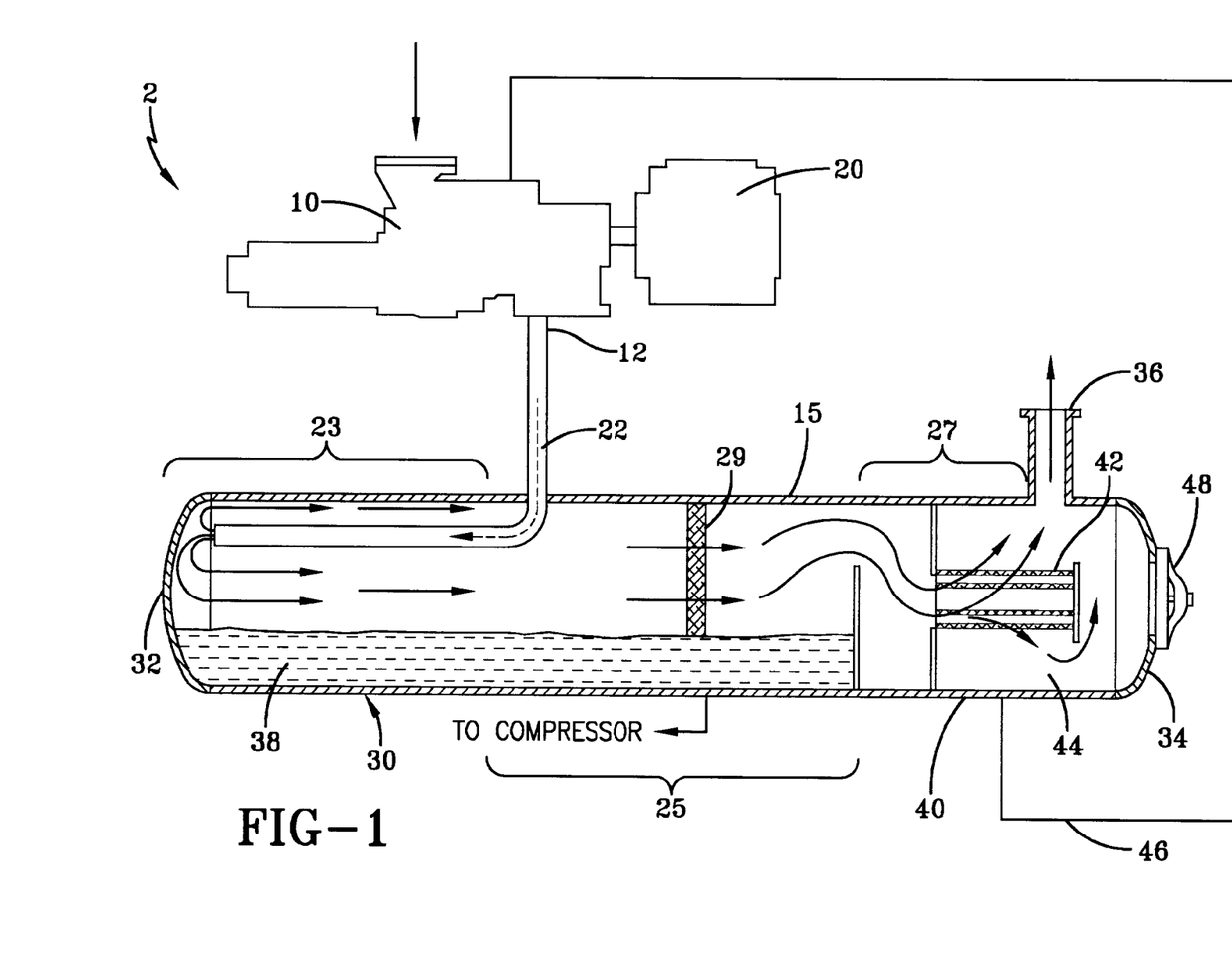
FIG. 1 illustrates a compression system with an oil separator system.

FIG. 1 illustrates an embodiment of a compression system that can incorporate the present invention. The compression system 2 includes a compressor 10, a motor 20, and a separator arrangement 30. The compressor 10 and motor 20 can be integrally mounted with the separator arrangement 30 or alternatively, the compressor 10, motor 20 and separator arrangement 30 can be separately mounted. The compressor 10 operates to compress a gas from a lower pressure to a higher pressure. The compressed gas can include entrained lubricant having a random size distribution. The droplet size of the lubricant can vary from greater than 1000 microns to submicron. The compressed gas and entrained lubricant exits the compressor 10 at a discharge port 12 where it is carried by conduit 22 into the separator arrangement 30.

In a preferred embodiment, the separator arrangement 30 is a horizontal separator in which the compressed fluid moves substantially axially (i.e., horizontally) through the separator arrangement 30. In another embodiment, a vertical separator arrangement may also be used. The separator arrangement 30 can include a shell 15 having a first head 32, a second head 34, and a discharge port 36. The separator arrangement 30 preferably has three stages, a first stage 23 where the direction of the fluid is changed, a second stage 25 where droplets are removed from the fluid stream and a third stage 27. In addition, the second head 34 can include a manway 48 or headway that provides ready access to components in the third stage 27.

Compressed gas with entrained lubricant traveling at high velocity enters the first stage 23 of the separator arrangement 30 through conduit 22. In this first stage 23, the compressed gas expands on exiting the conduit 22, experiencing a velocity drop. The compressed gas and entrained lubricant then strike a barrier, i.e., the first head 32, and undergo a direction change. A portion of the entrained lubricant, e.g., the larger droplets or agglomerated smaller droplets resulting from contact with first head 32, separate as liquid into a bottom portion 38 of the shell 15. This occurs as the droplets reach a critical size such that gravity draws these larger droplets from the fluid stream. A substantial portion of the remaining entrained lubricant is smaller than this critical droplet size and remains in the fluid stream. In the first stage 23, droplets and/or particles of about 70 microns or larger are agglomerated and substantially removed by gravity. The remaining fluid leaving the first stage 23 includes droplets entrained in the compressed gas as a combination of fine aerosol and a fine mist. The mist includes droplets having a size distribution with a diameter in the range above about 1.0 micron to about 70 microns, with a very large number of particles in the submicron, or aerosol, range. The agglomerated lubricant from the first stage 23 may include a small amount of dissolved refrigerant. The liquid that drops to the bottom portion or sump 38 of shell 15 acts as a main oil reservoir and is returned to compressor 10, where it lubricates the bearings and other moving parts of the compressor 10. This lubricant is filtered and cooled before returning to the main compressor, which return may be accomplished by an additional component, e.g., a pump, in some systems.

The fluid then moves into the second stage 25 of the separator arrangement 30 to remove additional lubricant droplets from the compressed gas. A number of options are available for this stage, each of the options removing droplets of different sizes. One option is to utilize the length of the shell 15 to remove droplets as the compressed gas travels along the length of the shell 15. This option is of limited value in a shell 15 of relatively short length. A second option utilizes a plate pack (not shown) in which the compressed gas and entrained lubricant passes over a series of stationary plates. Lubricant droplets having a size in the range of about 15 microns to about 700 microns are removed from the stream in this option, agglomerating on the plates as the fluid passes over the plates. A few smaller particles and a few remaining larger particles may also agglomerate on the plates. Another option shown in FIG. 1 utilizes a mesh pad 29, typically a large metallic mesh structure through which the compressed gas passes. As the compressed gas with the entrained lubricant contacts the mesh structure of the mesh pad 29, liquid droplets agglomerate on the mesh structure. Mesh pads typically remove droplets in the range of about 5 microns and larger, leaving only droplets in a very fine mist or aerosol range. Regardless of the structure selected for the second stage 25, the agglomerated lubricant drops to the sump 38 with the lubricant removed in the first stage 23.

The fluid leaving the second stage 25 in the form of a compressed gas having entrained mist and aerosol then moves into the third stage 27 of the separator arrangement 30. The third stage 27 can include a coalescer portion 40. The coalescer portion 40 can include at least one filter, and typically a series of filters of progressively finer mesh in the form of fibers. In a preferred embodiment of the present invention, these filters are incorporated into one or more coalescing elements 42. The coalescing element 42 preferably has a substantially cylindrical shape, although any suitable shape can be used. The coalescer portion 40 also includes a coalescer reservoir 44, a return line 46 from the coalescer reservoir 44 to compressor 10 and a manway 48 to provide access to the coalescer portion 40. Discharge port 36 of separator 30 is located in the coalescer portion 40 downstream of the one or more coalescing elements 42.

The purpose of the coalescer portion 40, and specifically the one or more coalescing elements 42, is to remove as much of the remaining lubricant from the compressed gas as possible, so that the lubricant can be returned to the compressor 10 to perform its lubricating function, and the compressed gas can pass downstream of the separator arrangement 30, e.g., into a condenser of an HVAC system or into a storage container of a natural gas system, with as little entrained lubricant as possible. Thus, the coalescing element 42 has to remove the remaining mist and as much of the aerosol as possible from the compressed fluid before it leaves the separator arrangement 30. As the gas with entrained mist and aerosol pass into the coalescer portion 40, the mist-like particles form droplets on the filter(s) of the coalescing element 42 and drop into coalescer reservoir 44. The filter or series of filters in the coalescing element 42 are comprised of fine mesh fibers, such as glass microfibers. These microfibers have sufficient surface area to drop the velocity of the gas and mist passing through it sufficiently so that the filters are effective to coalesce the mist into droplets that fall to the coalescer reservoir 44 as a liquid.

Once the compressed gas has passed through the at least one filter of the coalescing element 42, the gas exits the separator arrangement 30 through discharge port 36 into a conduit for transference downstream for subsequent processing. The liquid agglomerated into coalescer reservoir 44, which is substantially lubricant but may include a small amount of dissolved refrigerant, is returned via return line 46 to the compressor 10 after filtering. Because the coalescer reservoir 44 is the low pressure point of the separator arrangement 30, yet on the high pressure side of the system, the lubricant in the coalescer reservoir 44, being at a higher pressure than the pressure on the low pressure side (suction side) of the compressor 10, is returned by this pressure differential to compressor 10 where the lubricant is used to lubricate and seal moving parts of the compressor 10.

Figure 2:
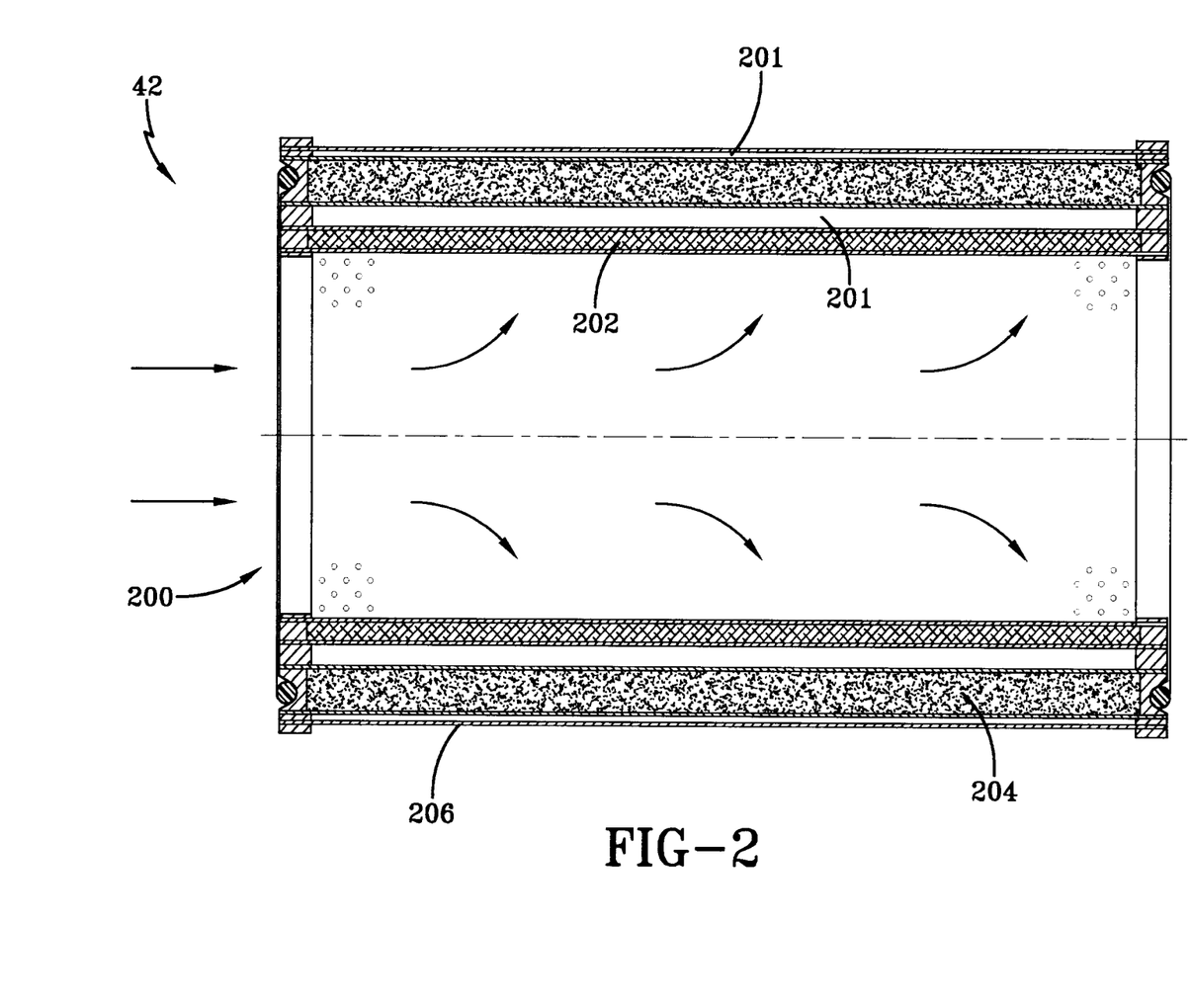
FIG. 2 illustrates a longitudinal cross sectional view of an embodiment of the coalescing element of the present invention.

FIG. 2 illustrates one embodiment of the coalescing element 42 of the present invention. As shown in FIGS. 1 and 2, the coalescing element 42 is preferably horizontally mounted, but in other embodiments of the present invention, the coalescing element 42 can be vertically mounted. As discussed above, the coalescing element 42 is used to remove entrained lubricant in a mist or aerosol form from the gas flow before the gas exits the separator arrangement 30. The gas and entrained lubricant enters the coalescing element 42 from the second stage 25 at an inlet 200 located at one end of the coalescing element 42. The other end of the coalescing element 42 is sealed or closed, preferably as a result of mounting the coalescing element 42 in the coalescer portion 40. The sealing or closing of the end of the coalescing element 42 opposite the inlet 200 forces the gas and entrained lubricant to exit the coalescing element 42 through the sides of the coalescing element 42.

After entering the inlet 200 of the coalescing element 42, the gas passes through a first filter element 202, a second filter element 204 and an outer mesh or screen member 206. The first filter element 202, the second filter element 204 and the outer mesh or screen member 206 are substantially coaxial to one another and separated by air gaps 201. The first filter element 202 and the second filter element 204 are used to remove any entrained lubricant from the gas flow. The outer mesh or screen member 206 is preferably a perforated metal or expanded metal used to strengthen the coalescing element 42 and to assist in the drainage of the coalesced lubricant from the coalescing element 42. It is to be understood that while FIG. 2 shows the first filter element 202 and the second filter element 204, any desired number of filter elements can be used, including only one filter element or more than two filter elements.

Each of the first filter element 202 and the second filter element 204 have a substantially cylindrical shape and include a filter media surrounded by a mesh or screen member on each side to contain the filter media. The filter media can be held in the cylindrical shape by any suitable technique including adhesives. Similarly, the mesh or screen members can be held in the cylindrical shape by any suitable technique. Preferably, the inner mesh or screen member surrounding the filter media is perforated metal or expanded metal and the outer mesh or screen member surrounding the filter media is a wire mesh. However, in other embodiments both the inner and outer mesh or screen member can be the same type, i.e., both perforated metal, both expanded metal or both wire mesh. In still additional embodiments, the inner mesh or screen member surrounding the filter media is a wire mesh and the outer mesh or screen member surrounding the filter media is perforated metal or expanded metal.

The filter media of both the first filter element 202 and the second filter element 204 can be a fine material fiber or microfiber material, such as fiberglass, which causes the remaining mist and aerosol lubricant to coalesce into droplets on or in the filter media, after which, by gravity, the droplets fall into a coalescer reservoir 44. In another embodiment of the present invention, the filter media can be in a pleated or convoluted arrangement instead of a fibrous arrangement. Furthermore, the specific arrangement of the filter media can be selected based on desired performance characteristics and the ability to withstand operating conditions. In a preferred embodiment, the filter media in the first filter element 202 is a "roughing" filter media and the filter media in the second filter element 204 is "finish" filter media.

As discussed above, the lubricant coalesces on the filter media of the first filter element 202 and the second filter element 204. The coalesced lubricant can accumulate in the filter media, thereby reducing the amount of available filter media that can be used to coalesce lubricant from the gas stream. To remove this accumulated coalesced lubricant, a drainage mechanism is located in the air gaps 201 between the second filter element 204 and the outer screen 206 and/or between the first filter element 202 and the second filter element 204. In other embodiments having additional filter elements, the drainage mechanism can be located in the corresponding air gaps between filter elements. The drainage mechanism is located in the lower half and preferably at the bottom of the coalescing element 42, i.e., the "6 o'clock position" when mounted horizontally, and is in contact with the corresponding filter element with which the drainage mechanism is draining. The drainage mechanism is preferably a single member or piece that extends along the entire length of the coalescing element 42. However, in other embodiments, the drainage mechanism can include more than one member or piece, arranged either radially, longitudinally, or both. The drainage mechanism operates to drain or wick the accumulated lubricant out of the filter media and into the coalescer reservoir 44. Specifically, the drainage mechanism operates to remove or drain liquid from the filter media by reducing the surface tension along the line of contact between the filter media and the drainage mechanism. By draining the accumulated lubricant out of the filter media, the drainage mechanism reduces the saturation zone of the filter media and increases the available amount of filter media for coalescing lubricant out of the gas stream. The drainage mechanism can have any desired shape that maintains contact with the filter element including the filter media and can drain away the accumulated lubricant. Further, the drainage mechanism can be made of any suitable material including metals, rubber or plastic materials.

Figure 3:
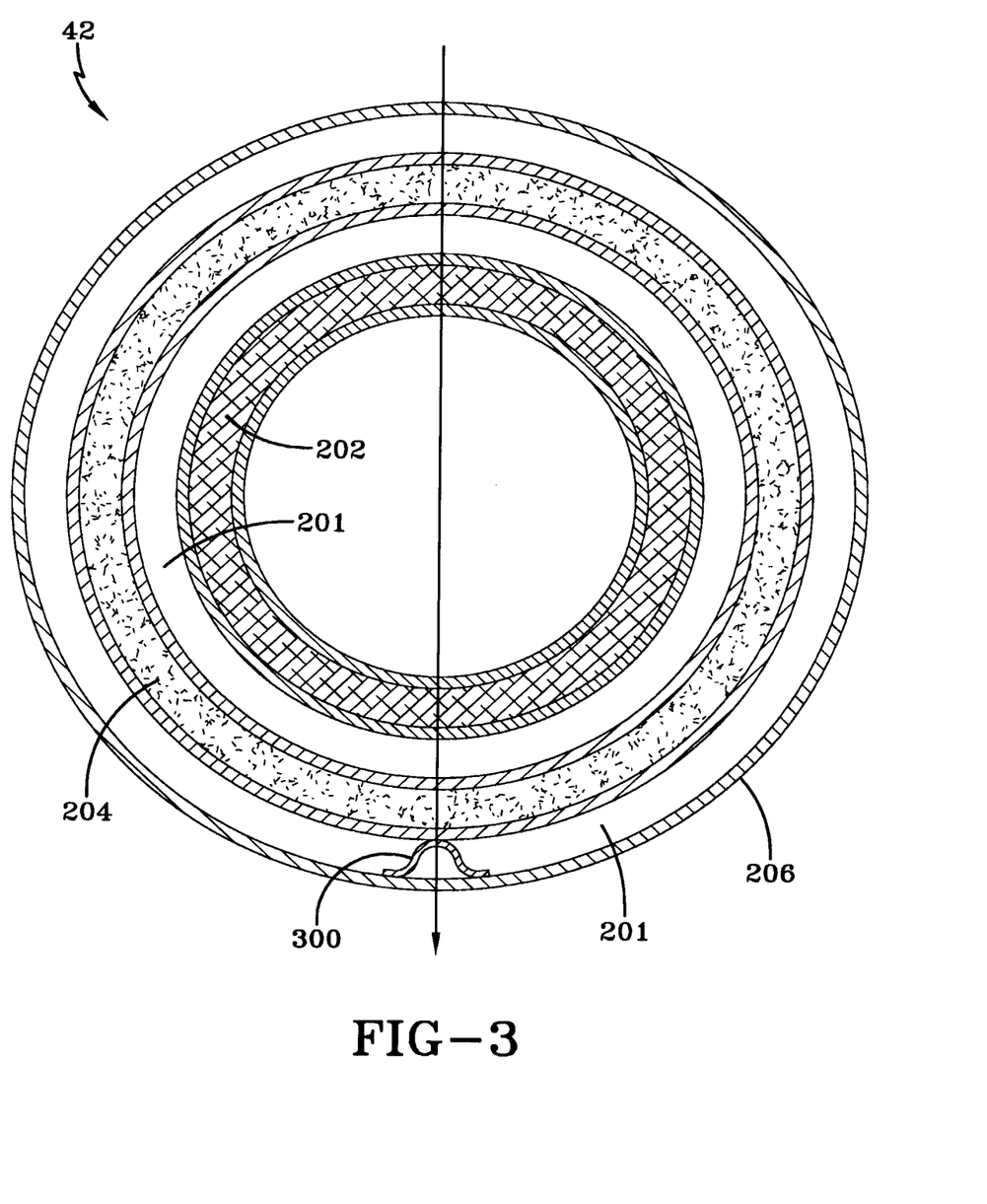
FIG. 3 illustrates a coalescing element with one embodiment of the drainage arrangement of the present invention.

FIG. 3 illustrates a preferred embodiment of the drainage mechanism. The drainage mechanism is preferably a drainage member 300 having a horseshoe, arch or inverted U shape with a curved or arced portion in contact with the second filter element 204 that extends to the outer screen or mesh element 206. The contact of the drainage member 300 with the second filter member 204 drains or wicks the accumulated lubricant out of the second filter element 204, which then flows down the sides of the drainage member 300 and out of the outer screen 206 to the coalescer reservoir 44.

Figure 4:
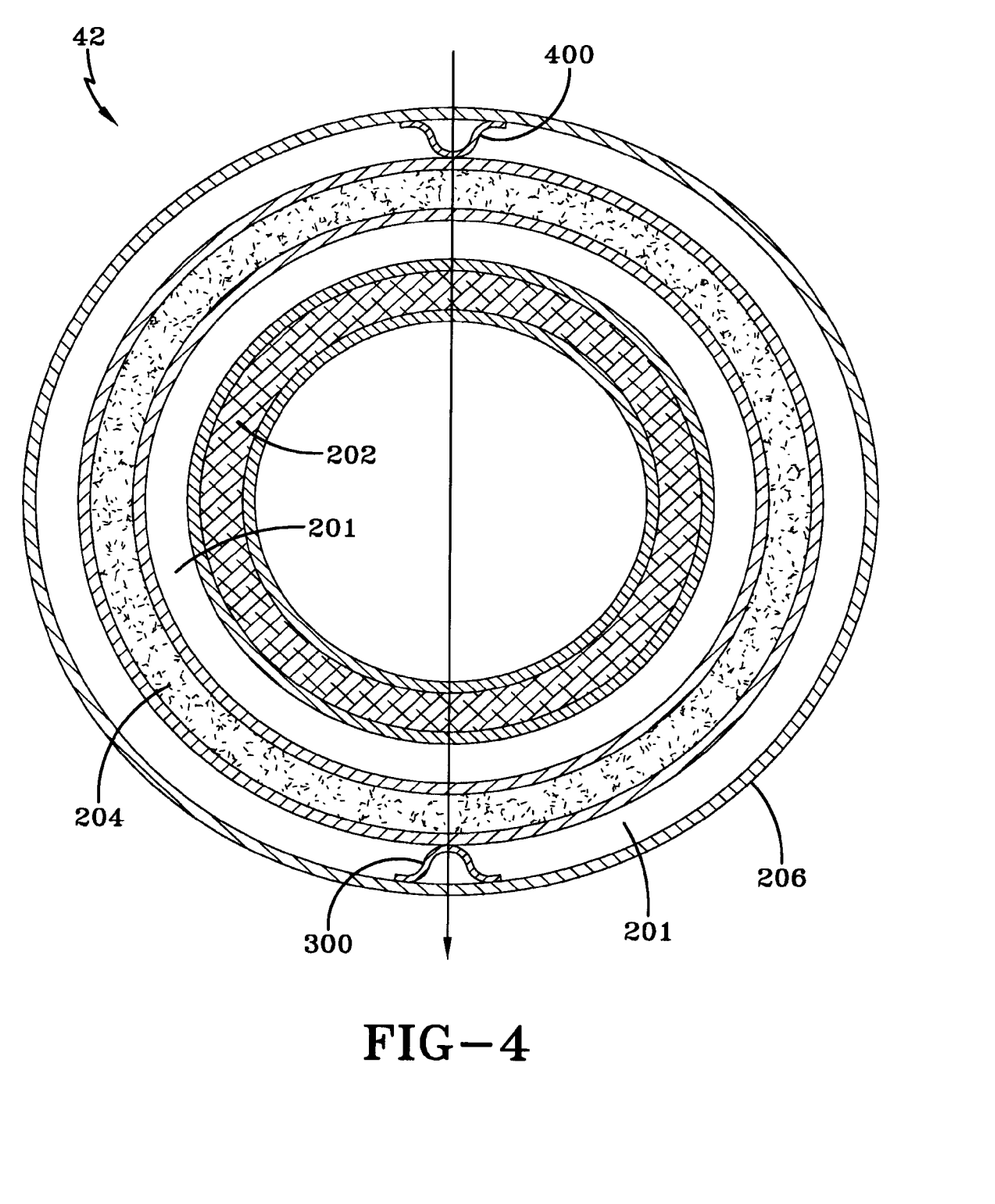
FIGS. 4-10 illustrate a coalescing element with several different embodiments of a drainage arrangement of the present invention.

FIGS. 4-10 illustrate different embodiments of the drainage mechanism of the present invention. FIG. 4 is similar to FIG. 3 in using the drainage member 300. However, FIG. 4 also shows a second member 400 disposed in the air gap 201 between the outer screen member 206 and the second filter member 204 opposite the drainage member 300. While the second member 400 may have a shape similar to drainage member 300, the second member 400 does not operate to remove any accumulated lubricant from the second filter member 204. The second member 400 is primarily used to provide support to the coalescing element 42 during the manufacturing process.

Figure 5:
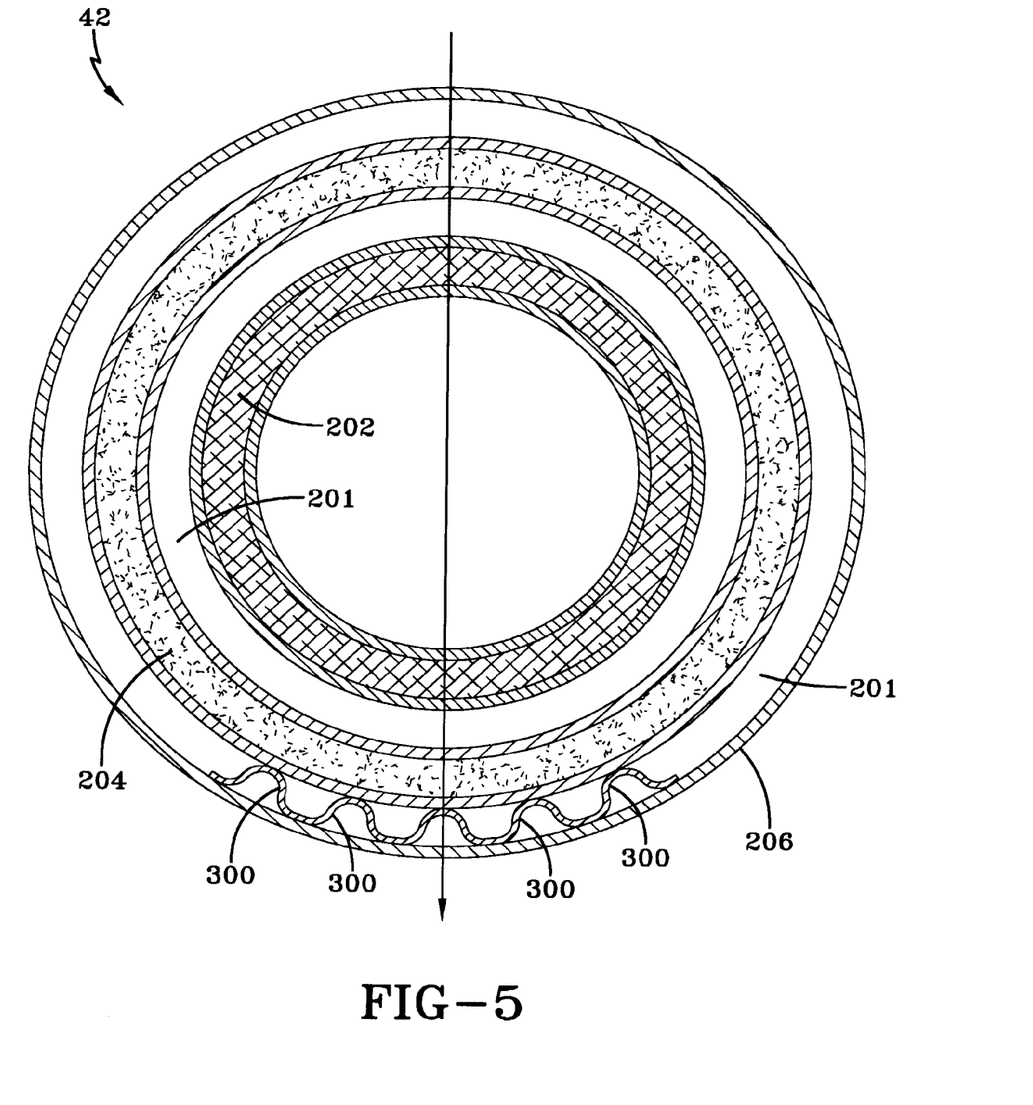

FIG. 5 is also similar to FIG. 3 except that multiple drainage members 300 are used instead of the one drainage member 300 from FIG. 3. The multiple drainage members 300 can be formed into a single piece or they can be inserted as individual pieces. To help with the drainage of the accumulated lubricant in this embodiment, there can be preferably one or more holes extending along the length of the ends or portions of adjacent drainage members 300 that are adjacent to the outer screen member 206 to drain lubricant. Alternatively, the drainage members 300 can be arranged so that there is adequate drainage space between the drainage members 300.

Figure 6:
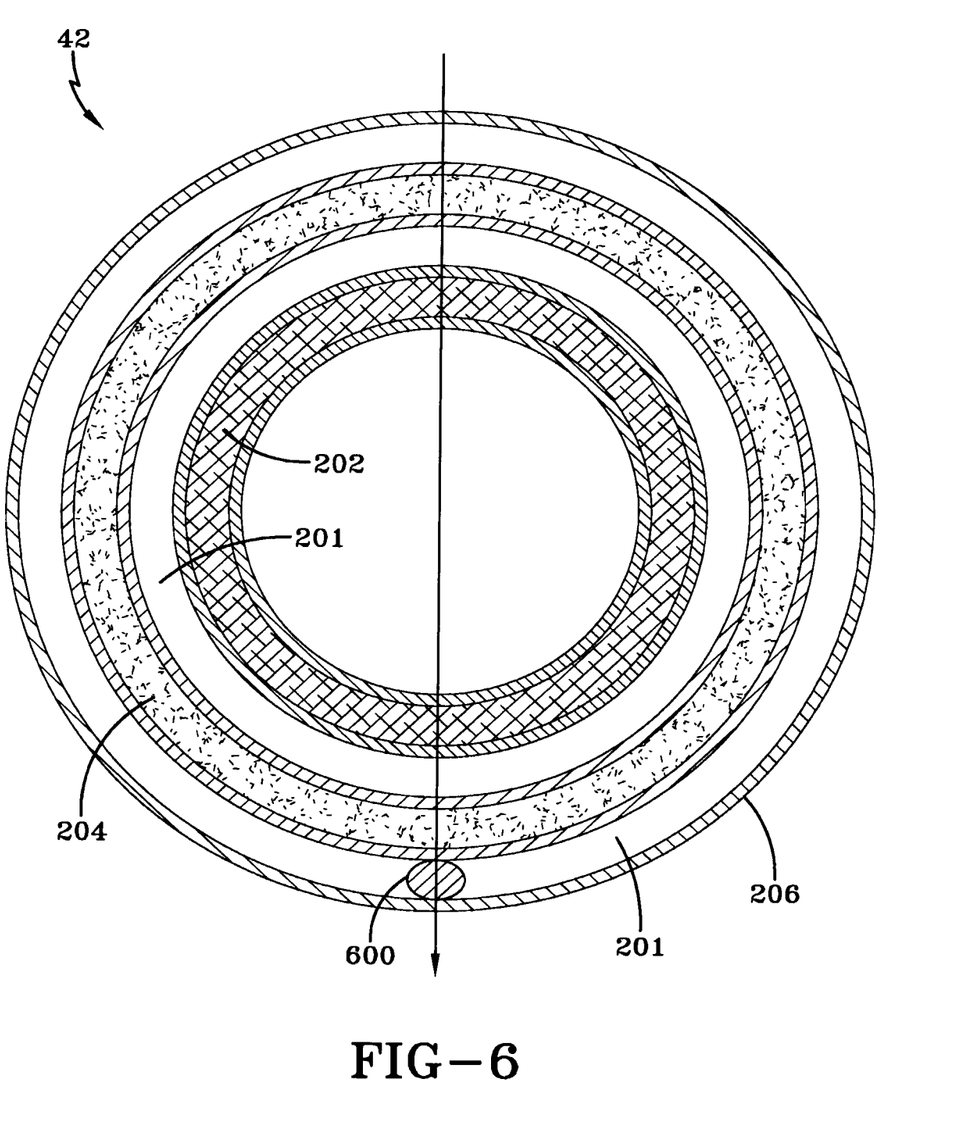
Figure 7:
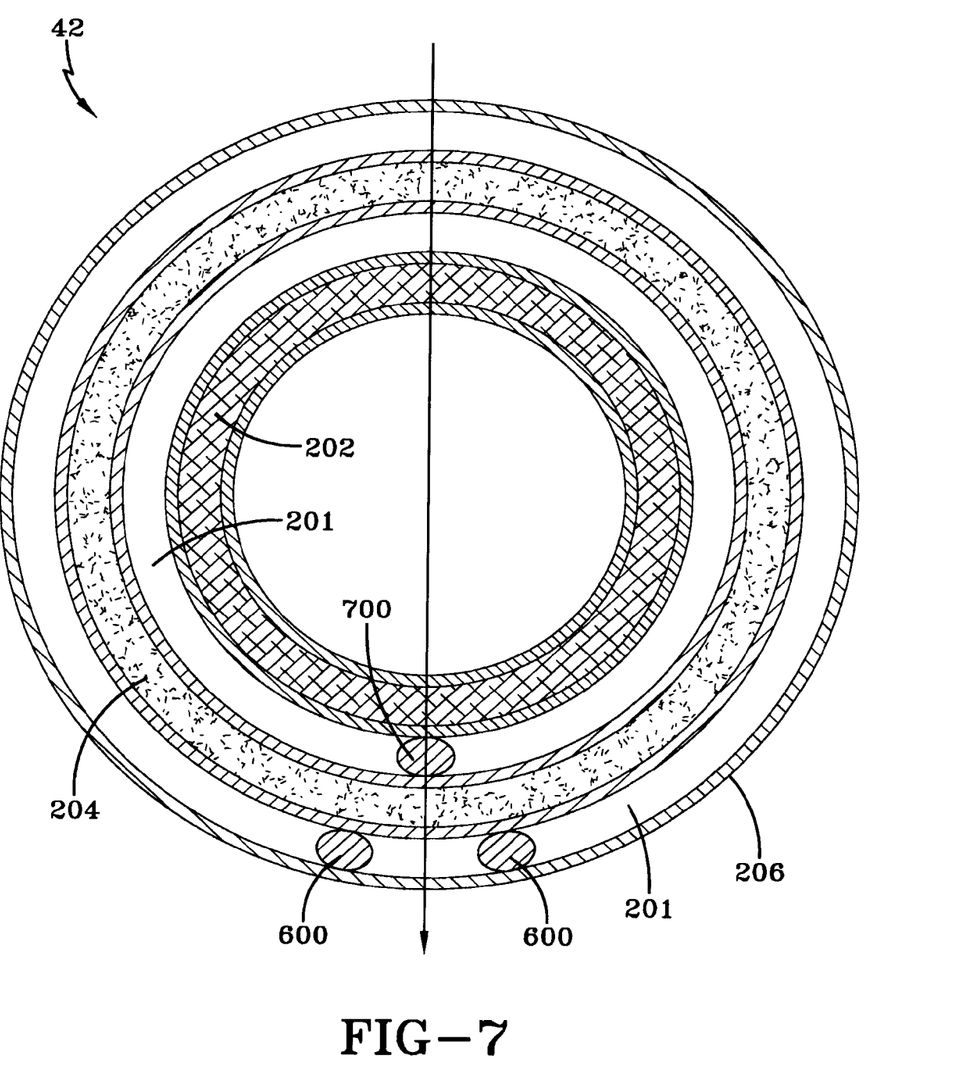

FIG. 6 is also similar to FIG. 3 except that a drainage member 600 is used instead of the drainage member 300 from FIG. 3. The drainage member 600 is preferably a strip of rubber or plastic material, such as an O-ring or Teflon strip, having rounded edges. FIG. 7 shows multiple drainage members 600 between the second filter element 204 and the outer screen member 206 and also includes an additional drainage member 700 located between the first filter element 202 and the second filter element 204. The additional drainage member 700 can be made of the same material as drainage member 600, but can also be made of a different material. The additional drainage member 700 operates to remove accumulated lubricant from the first filter element 202 and the multiple drainage elements 600 operate to remove the accumulated lubricant from the second filter element 204.

Figure 8:
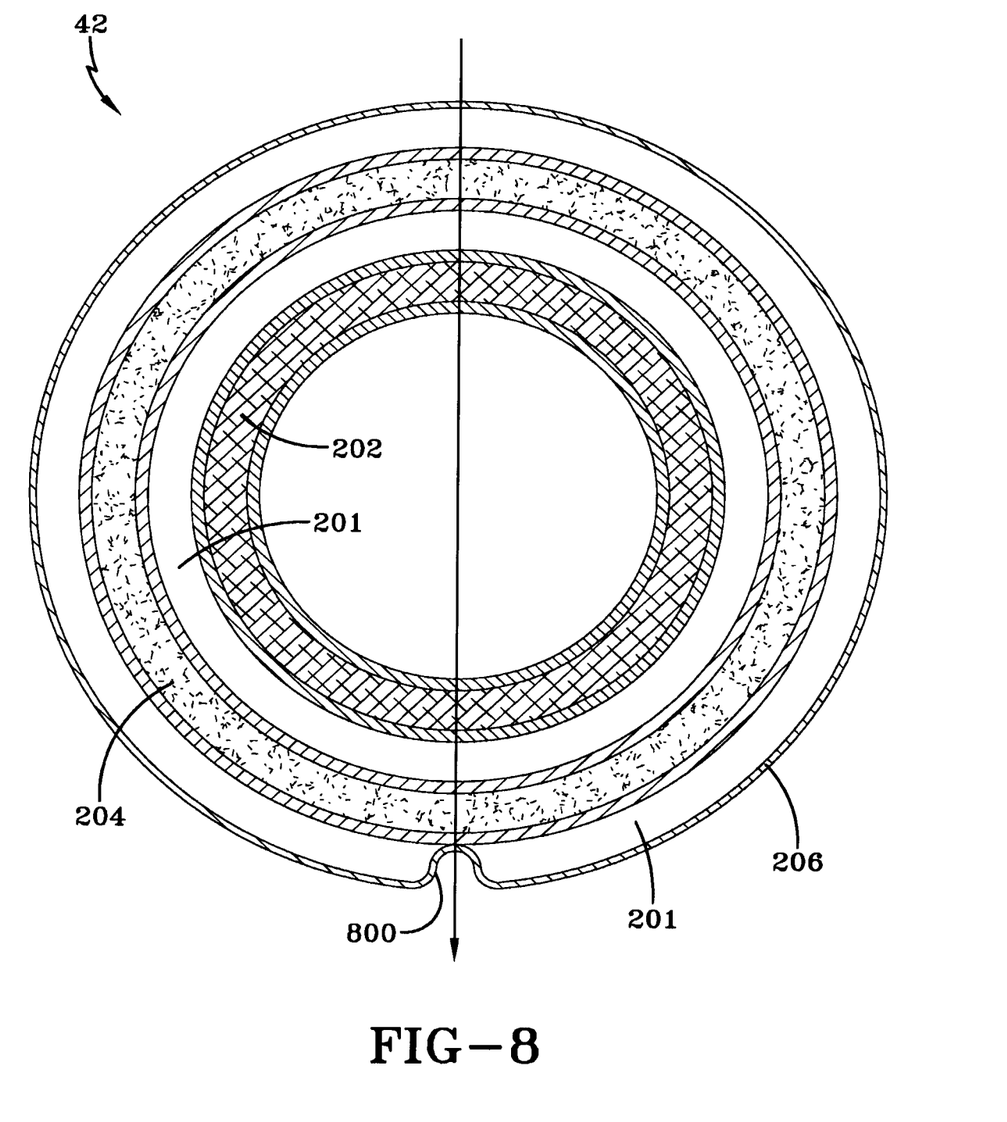
Figure 9:
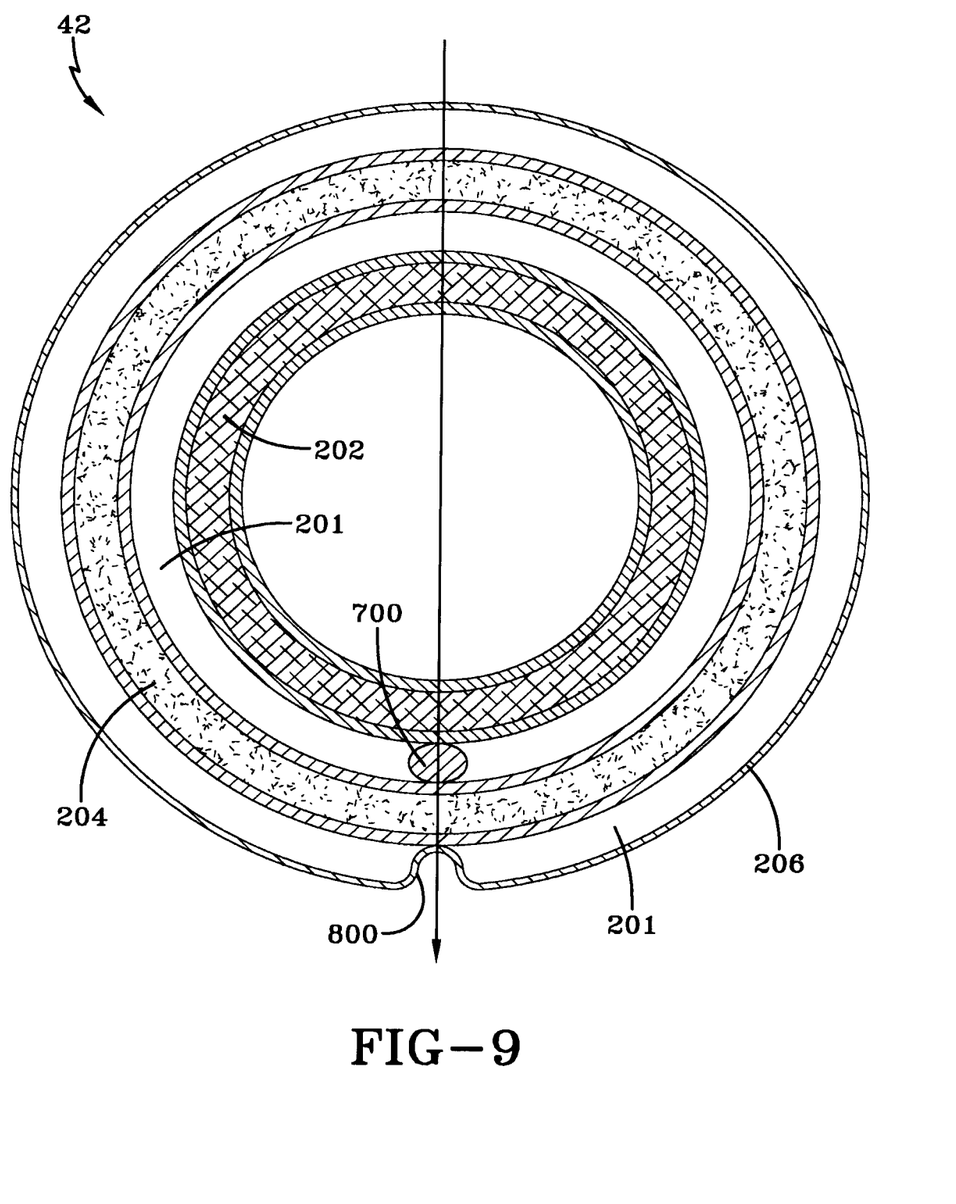
Figure 10:
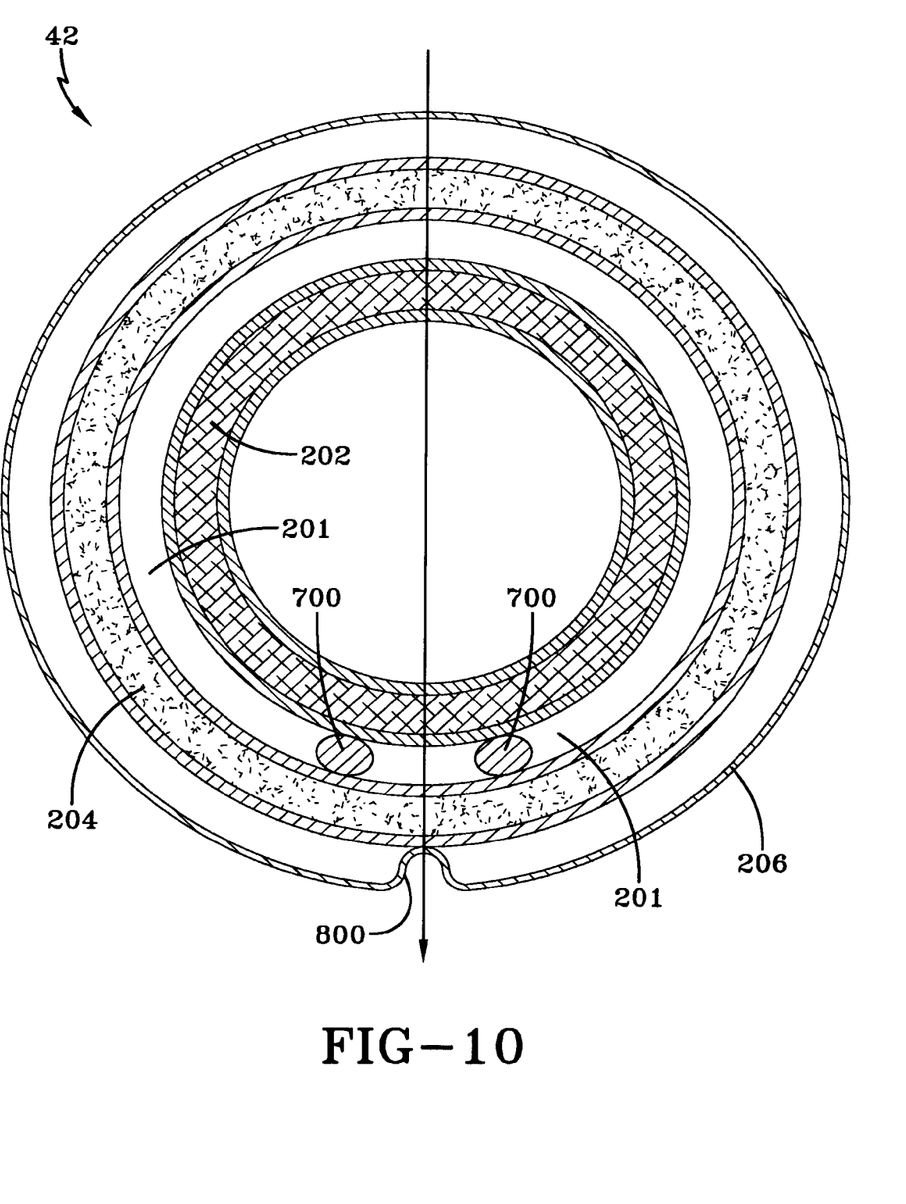

FIGS. 8-10 illustrate another embodiment of the drainage mechanism of the present invention. The drainage mechanism in this embodiment is formed by indenting a portion of the outer screen 206 to contact the second filter element 204. The indented portion 800 of the outer screen 206 operates in a similar manner to the drainage elements 300 and 600. As shown in FIGS. 9 and 10, one or more additional drainage members 700 can be used with the indented portion 800. In still another embodiment, more than one indented portion can be used as a drainage mechanism.

Figure 11:
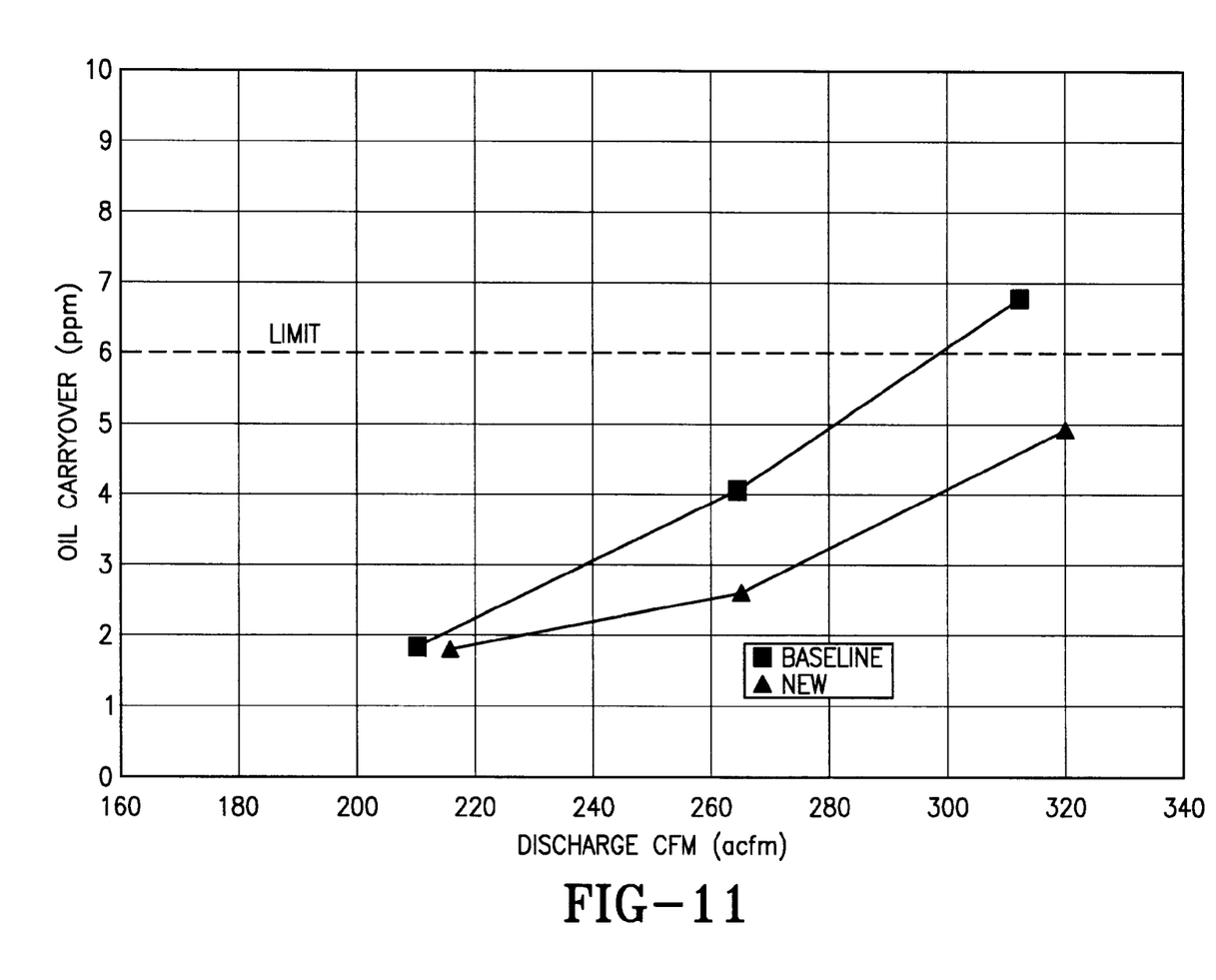
FIGS. 11 and 12 illustrate performance data of the coalescing element with the drainage arrangement of FIG. 4.
Figure 12:
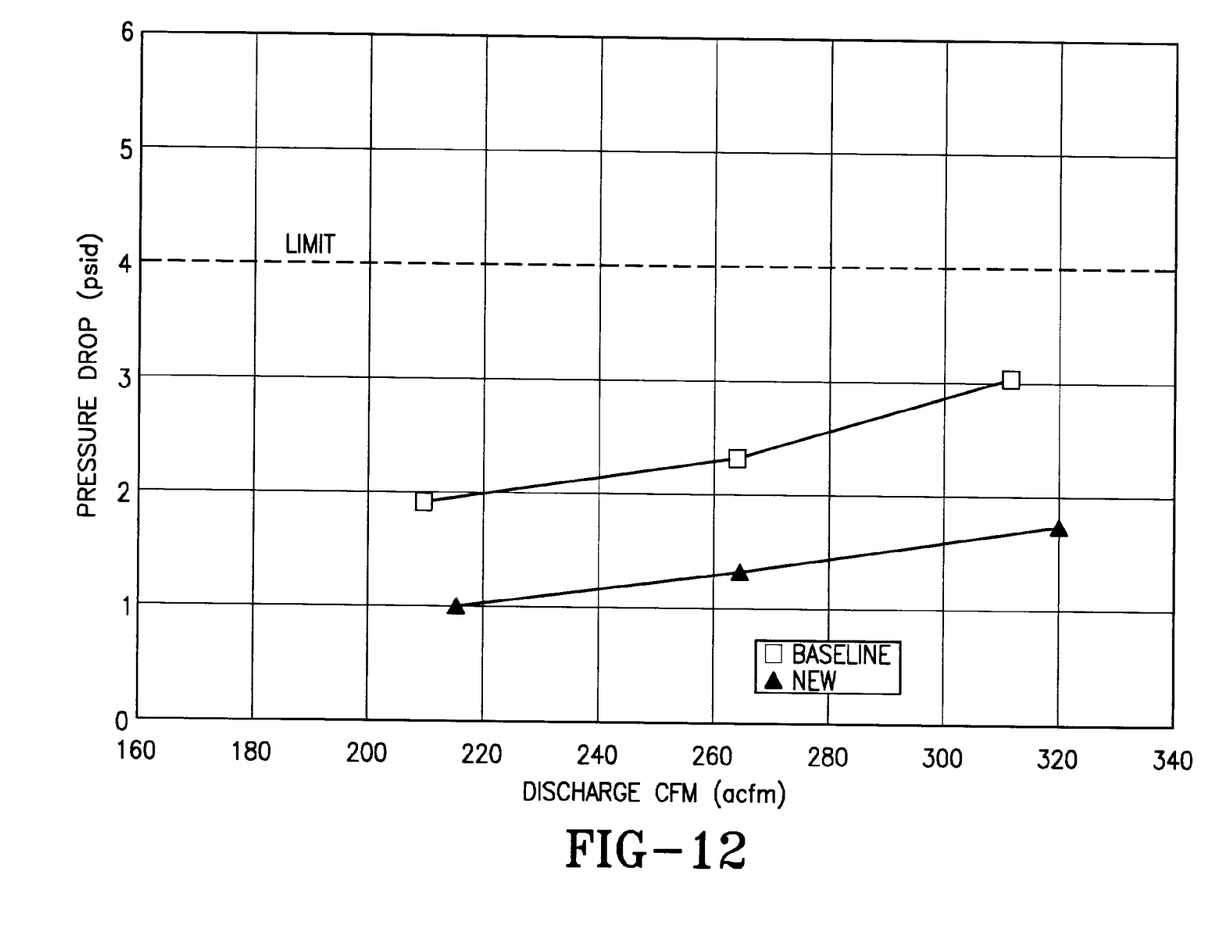

FIGS. 11 and 12 show performance data of the coalescing element of the present invention. For the evaluations shown in FIGS. 11 and 12, the same compression system 2 using the same refrigerant and operating under the same conditions, e.g., temperature and pressure, was used. FIG. 11 shows a comparison of the remaining entrained lubricant after passing through the coalescer portion 40. The "baseline" measurements were taken with a coalescing element not having a drainage mechanism and the "new" measurements were taken with a similar coalescing element arranged according to FIG. 4, including drainage member 300. As can be seen in FIG. 11, less oil remained in the gas flow when using the embodiment of the coalescing element from FIG. 4.

FIG. 12 shows a comparison of the pressure drop of the gas flow through the coalescer portion 40. The "baseline" measurements were taken with a coalescing element not having a drainage mechanism and the "new" measurements were taken with a similar coalescing element arranged according to FIG. 4, including drainage member 300. As can be seen in FIG. 12, the pressure drop of the gas through the coalescer portion 40 was lower when using the embodiment of the coalescing element from FIG. 4. This reduction in pressure drop equates to a reduction in the power consumption of the compression system 2. Finally, it is to be understood that the test results shown in FIGS. 11 and 12 were for a specific system and that the incorporation of the coalescing element 42 into different systems may result in different test results.

In one embodiment of the present invention, the compression system 2 can be incorporated in a heating, ventilation, and air conditioning (HVAC), refrigeration or liquid chiller system. In addition to the compressor 10, the system also includes a condenser, an expansion device and a water chiller or evaporator. Compressor 10 compresses a refrigerant vapor and delivers the vapor to the condenser, after passing through the separator arrangement 30, using discharge port 36. The refrigerant vapor delivered to the condenser enters into a heat exchange relationship with a fluid, e.g., air or water, and undergoes a phase change to a refrigerant liquid as a result of the heat exchange relationship with the fluid. The condensed liquid refrigerant from the condenser flows to the evaporator after passing through the expansion device. The liquid refrigerant with possibly some vapor refrigerant enters the evaporator and enters into a heat exchange relationship with a fluid, e.g., air or water, and undergoes a phase change to a refrigerant vapor as a result of the heat exchange relationship with the fluid. The vapor refrigerant in the evaporator exits the evaporator and returns to the compressor 10 by a suction line to complete the cycle.

The compression system 2 includes a motor or drive mechanism 20 to drive the compressor 10. While the term "motor" is used with respect to the drive mechanism for the compressor 10, it is to be understood that the term "motor" is not limited to a motor, but is intended to encompass any component that can be used in conjunction with the driving of motor 10, such as a variable speed drive and a motor starter. In a preferred embodiment of the present invention, the motor or drive mechanism 20 is an electric motor and associated components. However, other drive mechanisms, such as steam or gas turbines or engines and associated components can be used to drive the compressor 10.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lubricant coalescing element for use in a gas compression system, the lubricant coalescing element comprising:
   a substantially cylindrical outer screen having a center axis;
   at least one filter positioned inside the outer screen and being coaxial with the outer screen; and
   a drainage member positioned in an air gap between the at least one filter and the outer screen, the drainage member having a first end in contact with the at least one filter to drain coalesced lubricant out of the at least one filter in a direction perpendicular to the center axis and a second end opposite the first end in contact with the outer screen, the drainage member comprising a continuous outer surface between the first end and the second end to provide a flow path for the coalesced lubricant from the at least one filter to the outer screen.

2. The lubricant coalescing element of claim 1 wherein the first end of the drainage member is in contact with the at least one filter along a single line of contact.

3. The lubricant coalescing element of claim 2 wherein the drainage member comprises a single linear element extending from a first end of the outer screen to an axially opposed second end of the outer screen.

4. The lubricant coalescing element of claim 2 wherein the first end of the drainage member has a curved shape positioned in contact with the at least one filter.

5. The lubricant coalescing element of claim 2 wherein the drainage member is a strip with curved edges and a curved edge of the strip is positioned in contact with the at least one filter.

6. The lubricant coalescing element of claim 2 wherein the drainage member extends substantially continuously along the at least one filter in a direction substantially parallel to the center axis.

7. The lubricant coalescing element of claim 2 wherein the at least one filter comprises a plurality of filters, the plurality of filters are arranged concentrically and are coaxial with the outer screen.

8. The lubricant coalescing element of claim 7 further comprising at least one additional drainage member, the at least one additional drainage member is positioned between adjacent filters of the plurality of filters.

9. The lubricant coalescing element of claim 2 wherein the first end of the drainage member reduces the surface tension of the coalesced lubricant along the line of contact.

10. The lubricant coalescing element of claim 2 further comprises:
    the drainage member is a first drainage member; and
    a second drainage member, the second drainage member being positioned radially opposite the first drainage member.

11. The lubricant coalescing element of claim 1 further comprises:
    the drainage member is a first drainage member;
    a plurality of second drainage members positioned in the air gap and in contact with the outer screen and the at least one filter to drain coalesced lubricant from the at least one filter; and
    the plurality of second drainage members being positioned adjacent to the first drainage member.

12. The lubricant coalescing element of claim 1 wherein the drainage member is integral with the outer screen.

13. The lubricant coalescing element of claim 12 wherein the first end of the drainage member comprises a curved portion of the outer screen.

14. The lubricant coalescing element of claim 13 further comprising:
    the at least one filter comprises a plurality of filters, the plurality of filters are arranged concentrically and are coaxial with the outer screen; and
    at least one additional drainage member positioned between adjacent filters of the plurality of filters.

15. A system to remove entrained lubricant from a compressed gas, the system comprising:
    a shell having an inlet port and a discharge port;
    a first stage positioned in the shell, the first stage being configured to change a direction of flow of gas entering the shell through the inlet port;
    a second stage positioned in the shell near the first stage, the second stage being configured to remove lubricant droplets from the gas flow; and
    a third stage positioned in the shell near the second stage, the third stage being configured to remove entrained lubricant mist and aerosol from the gas flow, the third stage comprising a coalescing element, the coalescing element comprising:
        a substantially cylindrical outer screen positioned horizontally in the third stage, the outer screen having a center axis;
        at least one filter positioned inside the outer screen and being coaxial with the outer screen; and
        a drainage member positioned in an air gap between the at least one filter and the outer screen, the drainage member having a first end in contact with the at least one filter to drain coalesced lubricant out of the at least one filter in a direction perpendicular to the center axis and a second end opposite the first end in contact with the outer screen, the drainage member comprising a continuous outer surface between the first end and the second end to provide a flow path for the coalesced lubricant from the at least one filter to the outer screen.

16. The system of claim 15 wherein the second stage comprises a mesh pad.

17. The system of claim 15 wherein the discharge port is positioned adjacent to the third stage and the third stage comprises a lubricant sump.

18. The system of claim 15 wherein the coalescing element has an open end to receive the gas flow from the second stage and a closed end positioned opposite the open end to force the gas flow through the at least one filter.

19. The system element of claim 15 wherein the first end of the drainage member is in contact with the at least one filter along a single line of contact.

20. The system of claim 19 wherein the drainage member comprises a single linear element extending continuously along the at least one filter from a first end of the outer screen to an axially opposed second end of the outer screen.

21. The system of claim 19 wherein the at least one filter comprises a plurality of filters, the plurality of filters are arranged concentrically and are coaxial with the outer screen.

22. The system of claim 21 wherein the drainage system further comprises at least one second drainage member, the at least one second drainage member is positioned between adjacent filters of the plurality of filters.

23. The system of claim 15 wherein the drainage member is integral with the outer screen.

\* \* \* \* \*